April 1, 1969 F. W. BERRY ET AL 3,436,079
BILLIARD CUE
Filed March 9, 1966
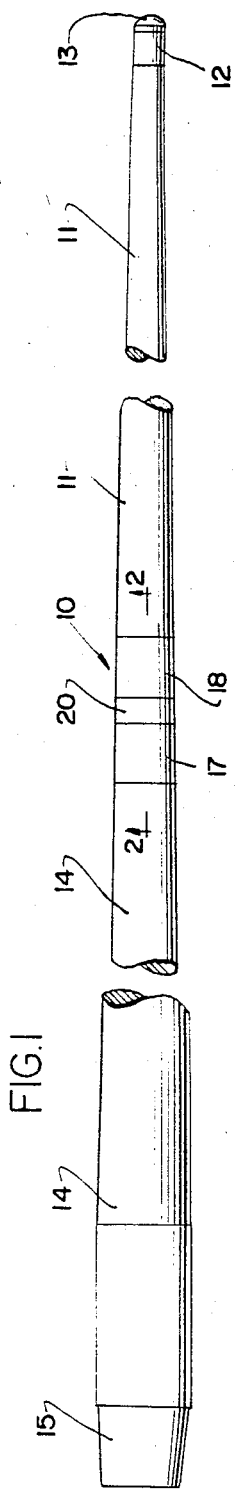
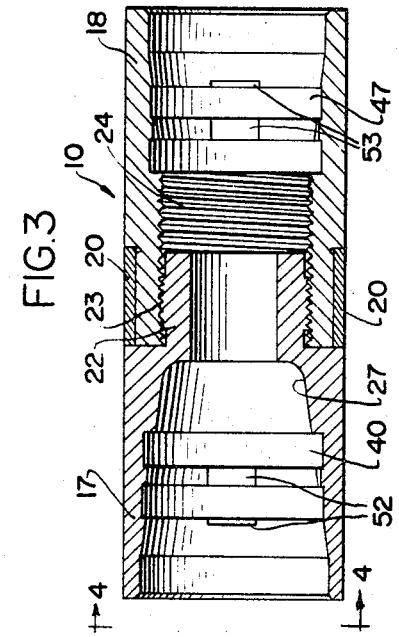
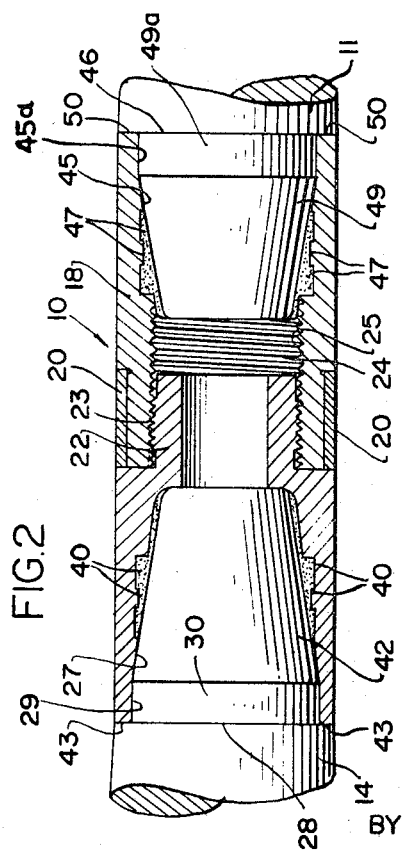
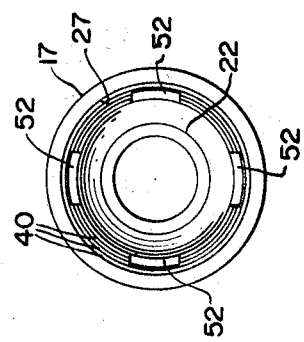
INVENTORS
FOSTER W. BERRY
KENNETH O. COGGER
BY Hofgren, Wegner, Allen,
Stellman & McCord.
ATTORNEYS United States Patent Office 3,436,079
Patented Apr. 1, 1969

3,436,079
BILLIARD CUE
Foster W. Berry and Kenneth O. Cogger, Muskegon, Mich., assignors to Brunswick Corporation, a corporation of Delaware
Filed Mar. 9, 1966, Ser. No. 532,987
Int. Cl. A63d 15/08
U.S. Cl. 273—68   3 Claims

ABSTRACT OF THE DISCLOSURE

A jointed billiard cue having two sections separably connected by a separable two-part joining device. The two parts of the joining device are associated one with each of the cue sections and are internally tapered to co-act with a taper at the end of the cue sections. The tapers of the cue sections are greater than the tapers of the joining members to permit a glue-line build-up. Mating surfaces on the cue sections and the joining device parts provide both concentricity and axial alignment between the cue sections and joining parts.

---

This invention relates to a combination of a multi-section billiard cue and a joining device for the sections.

Another object of this invention is to provide, in combination, sectional members of a billiard cue and a joining device having tapered interior surfaces adapted to receive tapered ends of the members to be joined, and to have mating surfaces between said joining device and said members whereby concentricity and axial alignment is obtained between the members.

A further object of this invention is to provide, in combination, a sectional billiard cue and a joining device having tapered interior surfaces adapted to receive tappered ends of the cue sections inserted into the joining device, thereby providing for a larger cross section of the cue sections at a line immediately inside the joining device to insure a greater rigidity of the joint and substantially reduce the possibility of cue breakage.

Further objects and advantages will become apparent from the following detailed description taken in connection with the accompanying drawing in which:

FIG. 1 is a fragmentary elevational view of a billiard cue embodying the present invention;

FIG. 2 is a sectional view on an enlarged scale taken generally along the line 2—2 of FIG. 1;

FIG. 3 is a sectional view on an enlarged scale similar to FIG. 2, but showing the joining device embodying this invention without the cue sections inserted therein; and FIG. 4 is a sectional view on an enlarged scale taken generally along the line 4—4 of FIG. 3.

While this invention is susceptible of embodiment in many different forms, there is shown in the drawing and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawing, more specifically to FIG. 1, a joining device is generally designated 10. In the exemplary embodiment illustrated, the joining device 10 connects two sections of a tapered billiard cue. One section of the billiard cue comprises a tapered shaft 11 having a circular cross section which is largest at a line adjacent the joining device 10 and gradually decreasing to its smallest dimension at the opposite end. At this opposite end, a cue point 12 has a semi-spherical cue tip 13 attached thereto. The other section of the billiard cue comprises a tapered butt 14 having a circular cross section which is smallest at a line adjacent the joining device 10 and gradually increasing to its largest diameter at the opposite end of the butt 14. At this opposite end, the butt 14 has a bumper 15.

The joining device 10 comprises a male member 17 and a female member 18 with an optional collar 20 of fiber or the like glued to member 18, having a circular cross section, secured between said two members to form surface continuity. The exterior surfaces of the members 17 and 18 are substantially cylindrical but have a slight external taper to match the taper of the cue. The members 17 and 18 can be made of a metal, such as brass, or of structural-type plastics, both reinforced and unreinforced, such as polycarbonate, polyimide, polysulfone, ABS, polyphenylene oxide, nylon, acetals, polyester, epoxy, and others.

Referring to FIG. 2, the male member 17 of the joining device 10 has a circular stud 22 formed at one end thereof, said stud 22 having a plurality of exterior threads 23 formed thereon. The female member 18 has a socket 24 formed at its end, said socket 24 having interior threads 25 correponding to the exterior threads 23 of the stud 22 and is adapted to receive said stud 22 in a threadable engagement, thereby joining the male member 17 and the female member 18 together.

The members 17 and 18 have interior openings which are circular in cross section and are partially tapered. Thus an interior surface 27 of the male member 17 is tapered and has its smallest diameter adjacent the stud 22. The surface extends to a location adjacent an open end 28 where a cylindrical surface 29 is provided to engage a cylindrical section 30 of the cue butt 14. These interengaging parts provide concentricity and an assembled rigidity because of an interference fit. Force is required to bring the parts into interengaging relation because of the force fit. Optionally provided are a plurality of peripheral and continuous grooves 40 formed on the interior surface 27 of the male member 17 for a purpose to be explained.

Carried within the male member 17 is the cylindrical section 30 and a tapered end 42 of the cue butt 14. The taper on the end 42 is slightly greater than the taper of the interior surface 27 to allow a glue line build-up between the end 42 and the surface 27 of the male member 17.

One of the advantages in providing the tapered surface 27 and the tapered end 42 on the butt 14, lies in the fact that the cross section of the cylindrical section 30, immediately adjacent the open end 28 of the male member 17, can be made larger than would be possible if the interior surface of the male member 17 were cylindrical. This factor provides a stronger cue at the beginning of the taper, thus giving a greater strength and rigidity to the butt 14.

A shoulder 43 is formed between the main portion of the butt 14 and the edge of the open end 28 of the male member 17. This shoulder 43 provides for axial alignment between the butt 14 and the male member 17 and gives an indication that assembly is complete. The wall thickness of the member 17 equals the reduction in diameter of the cue section at the cylindrical section 30 whereby the member and cue section have a smooth continuous outer surface.

Referring to the female member 18, as shown in FIG. 2, it is seen that the female member 18 is also provided with a tapered interior surface 45 similar to the tapered interior surface 27 of the male member 17. The interior surface 45 is circular in cross section having its largest diameter at a cylindrical surface 45a adjacent an open end 46 of the female member 18, while its smallest diameter is found adjacent the socket 24. Optionally provided are a plurality of peripheral grooves 47 having a substantially rectangular configuration, and being similar to grooves 40 formed on the interior surface of the male member 17, are formed on the interior surface 45 of the female member 18.

A tapered end 49 of the shaft 11 is inserted through the open end 46 into the interior of the female member 18. This tapered end 49 has a circular cross section having its largest diameter next to a reduced cylindrical section 49a, with its smallest diameter being in adjacent relationship with the socket 24, and with a slightly greater taper than the interior surface 45 to provide space for a glue line build-up.

A shoulder 50 is formed between the shaft 11 and the edge of the female member 18 along its open end 47. As explained in reference to the shoulder 43 of the male member 17, the shoulder 50 provides for axial alignment between the shaft 11 and the female member 18. The engagement between the cylindrical surface 45a of the female member 18 with the cylindrical section 49a of the shaft 11, provides concentricity between the female member 18 and the shaft 11.

Optionally provided are a plurality of longitudinal grooves 52 formed on the interior surface 27 of the male member 17, while similar longitudinal grooves 53 are formed on the interior surface 45 of the female member 18. Since the location, features, and appearance of the grooves in the male member 17 and in the female member 18 are the same, a reference will be made herein to a specific function for the set of grooves in the male member 17, only.

In order to secure the tapered end 42 of the butt 14 in the male member 17, as well as to secure the tapered end 49 of the shaft 11 in the female member 18, the respective interior tapered surfaces 27 and 45 of the members 17 and 18 are coated with a bonding agent which may be either of the curing type, such as epoxy, vinyl-phenolic, rubber-phenolic, casein latex, plastisol, and others, or the hot-melt type, including phenoxy, vinyl acetates, polyamides, and others. Since the ends 42 and 49 to be inserted, and the surfaces 27 and 45, which are to receive said ends, respectively, are tapered at slightly different angles, there is no danger that the bonding agent will be removed from the interior surfaces 27 or 45 and pushed in a direction of the travel of the tapered ends, since, due to the taper, any contact is made only when said ends are finally in place in the joining members. The grooves 40 and 52 may be provided optionally to receive and retain the bonding agent and to facilitate a mechanical lock between the inserted ends and the respective joining members when adequate production techniques are not used. In proper manufacture, after the tapered end 42 is inserted to the required limit so that the shoulder 43 is formed between the male member 17 and the butt 14, sufficient bonding is provided between the interior surface 27 of the male member 17 and the tapered end 42 of the butt 14 by the glue line build-up therebetween.

In assembly of this device, the interior surface 27 of the male member 17 and the interior surface 45 of the female member 18 are first coated with a suitable bonding agent, whereupon the tapered end 42 of the butt 14 is inserted into the male member 17 and the tapered end 49 of the shaft 11 is inserted into the female member 18 with the surfaces 29 and 45a in force fit relation with the cylindrical sections 30 and 49a, respectively. The female member 18 is brought into a close relationship with the male member 17 so that the stud 22 of the male member 17 engages the socket 24 of the female member 18. By turning the male member 17 relative to the female member 18, a threadable engagement results between the stud 22 and the socket 24 until both members 17 and 18 are locked together. The collar 20 surrounds and covers the connecting line between the male member 17 and the female member 18.

We claim:
1. A billiard cue comprising a butt section, a shaft section, and a joining device for connecting said sections in longitudinal alignment, said butt section having a connection end of a predetermined outer diameter and connection means including a first portion having a cylindrical outer surface of a diameter less than said predetermined diameter and a second portion having a tapered outer surface tapering from the diameter of said cylindrical first portion outward to a lesser diameter, said shaft section having a connection end of a predetermined outer diameter and connection means including, a first portion having a cylindrical outer surface of a diameter less than the predetermined diameter of said shaft connection end and a second portion having a tapered outer surface tapering from the diameter of said second mentioned cylindrical portion outward to a lesser diameter, said joining device comprising a hollow first member having first and second ends, the outer diameter of said first end corresponding to said predetermined outer diameter of said butt section connection end, an opening in the first end of said first member including a cylindrical portion and a tapered portion adapted to receive the cylindrical and tapered portions of said butt section connection means, the cylindrical portion of said hollow first member being located at the entrance to the opening in said first member and having a first diameter, the tapered portion of said first member tapering inwardly in a direction further into said opening to a second diameter less than the diameter of the cylindrical portion of said opening to provide a tapered interior surface, a hollow second member having first and second ends, the outer diameter of the first end of said second member corresponding to the predetermined outer diameter of the shaft section connection end, an opening in the first end of said second member including a cylindrical portion and a tapered portion adapted to receive the cylindrical and tapered portions of said shaft section connection means, said second member cylindrical portion being located adjacent the entrance to the opening in said second member and having a first diameter, said second member tapered portion tapering inwardly in a direction further into the opening in said second member to a second diameter less than the diameter of the cylindrical portion of said second member to provide a tapered interior surface, the tapers of the tapered portions of said sections being substantially greater than the tapers of the tapered portions of said hollow first and second members to provide bonding means build-up spaces between the tapered portions of said sections and members, bonding means filling the build-up spaces between said members and sections, a shoulder formed on each of the first end of said first member and the connection end of said butt section for providing axial alignment therebetween, a shoulder formed on the first end of said second member and the connection end of said shaft section for providing axial alignment therebetween, and means for releasably securing the second ends of said hollow first and second members together, whereby said sections and members may be axially and concentrically aligned and joined.

2. The billiard cue defined in claim 1 wherein the cylindrical surfaces of said sections and members are dimensioned to be engaged with a force fit, and the shoulders of said sections and members when in abutment indicate assembly is complete.

3. The billiard cue defined in claim 1 wherein the interior of each of said members has a plurality of longitudinal and lateral grooves retaining the bonding means for locking each of said members to the tapered ends of the cue sections.

References Cited

UNITED STATES PATENTS

| | | |
|---|---|---|
| 579,817 | 3/1897 | Connelly. |
| 1,976,324 | 10/1934 | Buhrke et al. _____ 273—80.8 X |
| 2,322,587 | 6/1943 | Payne _____ 285—284 |
| 3,232,613 | 2/1966 | Laube _____ 273—68 |

GEORGE J. MARLO, *Primary Examiner.*

U.S. Cl. X.R.

287—128